(12) United States Patent
Nakaso et al.

(10) Patent No.: US 9,469,283 B2
(45) Date of Patent: Oct. 18, 2016

(54) BRAKING APPARATUS OF VEHICLE

(71) Applicant: MITSUBISHI JIDOSHA KOGYO KABUSHIKI KAISHA, Minato-ku, Tokyo (JP)

(72) Inventors: Hiroyuki Nakaso, Tokai (JP); Kazufumi Hayashikawa, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/823,115

(22) Filed: Aug. 11, 2015

(65) Prior Publication Data
US 2016/0052495 A1 Feb. 25, 2016

(30) Foreign Application Priority Data

Aug. 22, 2014 (JP) ................. 2014-169339

(51) Int. Cl.
*G06F 19/00* (2011.01)
*B60T 7/22* (2006.01)
*B60L 7/26* (2006.01)
(Continued)

(52) U.S. Cl.
CPC ............... *B60T 7/22* (2013.01); *B60L 3/0015* (2013.01); *B60L 7/12* (2013.01); *B60L 7/18* (2013.01); *B60L 7/26* (2013.01); *B60L 11/1861* (2013.01); *B60L 15/2009* (2013.01); *B60T 1/10* (2013.01); *B60T 13/586* (2013.01); *B60L 2240/12* (2013.01); *B60L 2240/421* (2013.01); *B60L 2240/423* (2013.01); *B60L 2240/80* (2013.01); *B60L 2250/26* (2013.01); *B60T 2201/022* (2013.01); *B60T 2270/604* (2013.01); *Y02T 10/645* (2013.01); *Y02T 10/7005* (2013.01); *Y02T 10/705* (2013.01);
(Continued)

(58) Field of Classification Search
USPC .......................................................... 701/70
See application file for complete search history.

(56) References Cited

U.S. PATENT DOCUMENTS

2012/0310501 A1  12/2012  DeWitt et al.
2014/0046567 A1  2/2014  Schuler
(Continued)

FOREIGN PATENT DOCUMENTS

DE  10 2007 056 359 A1  5/2009
EP      1 839 985 A2    10/2007
(Continued)

OTHER PUBLICATIONS

European Search Report dated Jan. 4, 2016 issued in corresponding European Application No. 15182051.1.

*Primary Examiner* — Muhammad Shafi
(74) *Attorney, Agent, or Firm* — Birch, Stewart, Kolasch & Birch, LLP

(57) ABSTRACT

A braking apparatus 1 of a vehicle includes: a hydraulic brake device 4 that brakes the vehicle via friction in response to operation of a brake pedal; a regenerative brake device 5 that performs regenerative braking using, as an electricity generator, a motor 3 for running the vehicle; and a collision avoidance device 20 that performs automatic braking of the vehicle by controlling operation of the hydraulic brake device 4 in accordance with obstacle detection information detected by an obstacle detection device 21, to avoid collision of the vehicle with an obstacle, wherein an electric servo brake controller 10 of the collision avoidance device 20 terminates activation of the regenerative braking, if activated, before the automatic braking is started by the collision avoidance device 20.

6 Claims, 3 Drawing Sheets

(51) Int. Cl.
*B60T 1/10* (2006.01)
*B60L 3/00* (2006.01)
*B60L 7/12* (2006.01)
*B60L 7/18* (2006.01)
*B60L 11/18* (2006.01)
*B60L 15/20* (2006.01)
*B60T 13/58* (2006.01)

(52) U.S. Cl.
CPC ............ *Y02T 10/7044* (2013.01); *Y02T 10/72* (2013.01); *Y02T 10/7275* (2013.01)

(56) References Cited

U.S. PATENT DOCUMENTS

2015/0001919 A1\* 1/2015 Murayama .............. B60T 8/441
 303/14
2015/0161894 A1\* 6/2015 Duncan .................. G08G 1/163
 701/1

FOREIGN PATENT DOCUMENTS

| | | |
|---|---|---|
| GB | 2508668 A | 6/2014 |
| JP | 3888383 B2 | 2/2007 |
| WO | 2006/029353 A2 | 3/2006 |

\* cited by examiner

BRAKING APPARATUS OF VEHICLE

BACKGROUND OF THE INVENTION

1. Field of the Invention

The present invention relates to a braking apparatus of a vehicle equipped with a regenerative brake device and a friction brake device, and more particularly, to techniques of controlling braking force when automatic braking is executed by a collision avoidance device.

2. Description of the Related Art

A vehicle equipped with an electric motor for running the vehicle, such as an electric vehicle or hybrid vehicle, is conventionally provided with a regenerative brake device that uses the electric motor as an electricity generator when the vehicle is decelerating or running down a slope, to convert deceleration energy into electric energy to charge a battery mounted on the vehicle.

Such a vehicle equipped with a regenerative brake device is provided further with a friction brake device that brakes the vehicle by frictional force in response to operation of a brake pedal, like a hydraulic brake device.

Meanwhile, in recent years, more and more vehicles have come to be equipped with a collision avoidance device that detects an obstacle when the vehicle is running, and automatically brakes the vehicle if there is a risk of the vehicle colliding with an obstacle.

Further, a braking force control device for a vehicle equipped with a collision avoidance device, a regenerative brake device and a friction brake device has been proposed, in which the braking force generated by the friction brake device and that generated by the regenerative brake device are controlled when the automatic braking is performed for collision avoidance. In the device disclosed in Japanese Patent No. 3888383 by way of example, when the demanded braking force calculated based on the distance to an obstacle is smaller than a predetermined value, the regenerative braking alone is activated, and when the demanded braking force is greater than the predetermined value, both the regenerative braking and the friction braking are activated to secure sufficient braking force.

In the vehicle equipped with a collision avoidance device, a regenerative brake device and a friction brake device like the one disclosed in the above patent publication, if the battery becomes fully charged, for example, while both the regenerative braking and the friction braking are executed during the automatic braking for collision avoidance, electricity cannot be supplied to the battery any longer, with the result that the regenerative braking terminates. Thus, because of the termination of the regenerative braking, the braking force and, as a consequence, the rate of deceleration of the vehicle fluctuate during the automatic braking, causing a feeling of strangeness and possibly increasing variation in the braking distance.

SUMMARY OF THE INVENTION

An object of the present invention is therefore to provide a braking apparatus of a vehicle equipped with a collision avoidance device and a regenerative brake device, whereby fluctuation of braking force during automatic braking for collision avoidance can be reduced, thereby restraining fluctuation of deceleration rate of the vehicle.

To achieve the object, a vehicle braking apparatus according to the present invention includes: a friction brake device that brakes the vehicle via friction in response to operation of a brake pedal; a regenerative brake device that performs regenerative braking using, as an electricity generator, an electric motor for running the vehicle; and a collision avoidance device that performs automatic braking of the vehicle by controlling operation of the friction brake device in accordance with obstacle detection information detected by an obstacle detection device, to avoid collision of the vehicle with an obstacle, wherein the collision avoidance device terminates activation of the regenerative braking, if activated, before the automatic braking is started.

Thus, during execution of the automatic braking by the collision avoidance device, the vehicle is braked by the friction brake device only, without the regenerative braking being activated, so that fluctuation of the braking force accompanying termination of the regenerative braking during the automatic braking can be prevented. It is therefore possible to reduce fluctuation of the deceleration rate of the vehicle during execution of the automatic braking, thereby preventing the driver and the like from experiencing a feeling of strangeness and reducing variation in the braking distance.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

An embodiment of the present invention will be described below with reference to the drawings.

Figure 1:
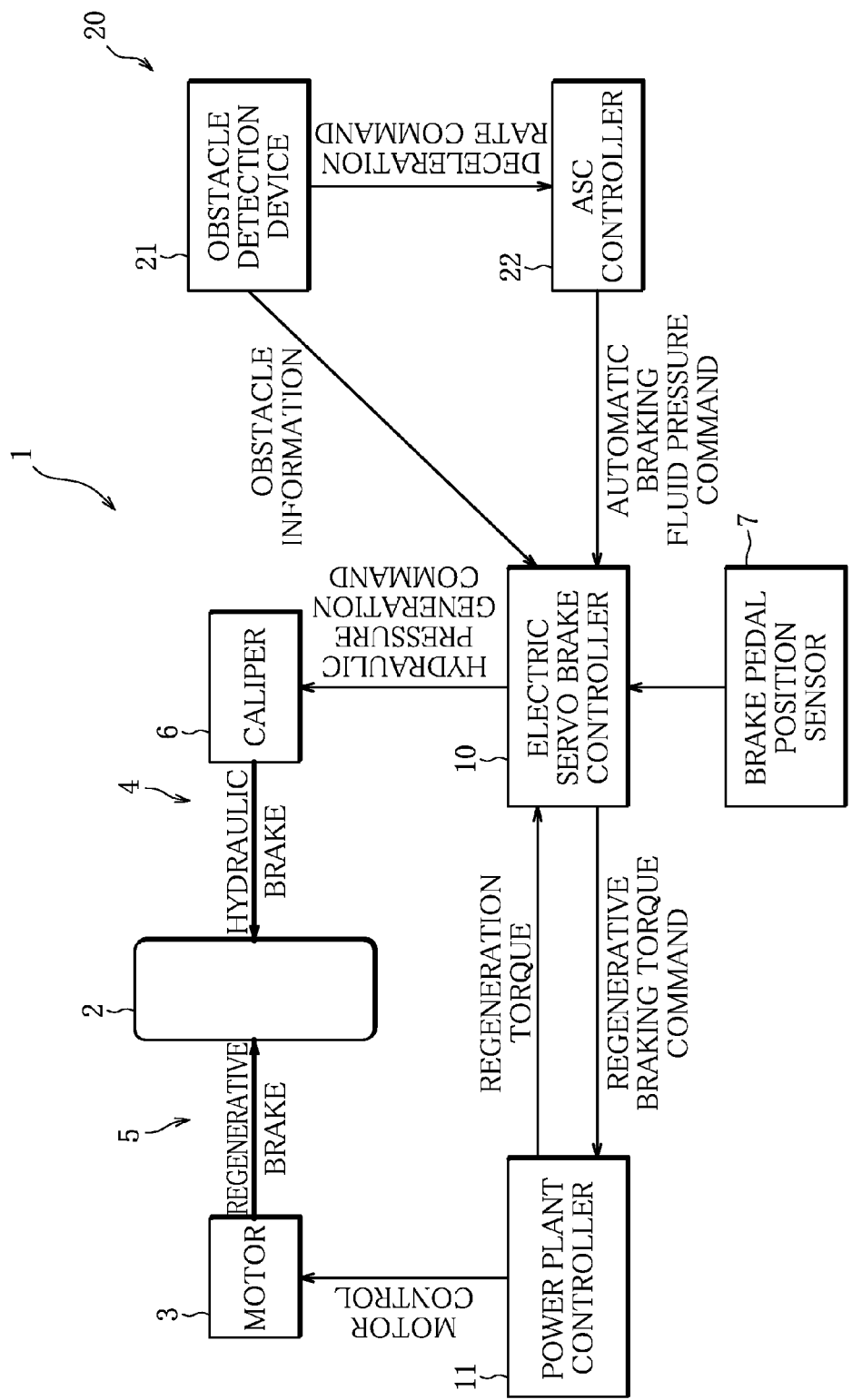
FIG. 1 illustrates a schematic configuration of a vehicle braking apparatus according to an embodiment of the present invention.

FIG. 1 illustrates a schematic configuration of a vehicle braking apparatus 1 according to the embodiment of the present invention. Referring to the figure, the configuration of the braking apparatus 1 will be described below.

The braking apparatus 1 of the embodiment is mounted on a vehicle whose drive wheel 2 is driven by a motor 3 (electric motor), such as an electric vehicle, hybrid vehicle or plug-in hybrid vehicle.

Operation of the motor 3 is controlled by a power plant controller 11, and electric power is supplied to the motor 3 from a drive battery, not shown, mounted on the vehicle to drive the motor 3.

As shown in FIG. 1, the vehicle braking apparatus 1 includes a hydraulic (oil) brake device 4 (friction brake device) associated with each of wheels including the drive wheel 2, and a regenerative brake device 5 (regenerative brake device) which generates braking force by allowing the motor 3 to be driven by rotation of the drive wheel 2 while using the motor 3 as an electricity generator.

The hydraulic brake device 4 includes a caliper 6 associated with the corresponding wheel.

The caliper 6 has an electric actuator for generating hydraulic pressure and operates in accordance with a hydraulic pressure generation signal input from an electric servo brake controller 10, to brake the wheel via friction by, for example, pressing a brake pad against a disc rotor.

The electric servo brake controller 10 comprises input-output units, memory (ROM, RAM, nonvolatile RAM, etc.), a central processing unit (CPU), and timers. In accordance with a brake pedal position (depression amount) input from a brake pedal position sensor 7 associated with the brake pedal of the vehicle, the electric servo brake controller 10 calculates a braking torque (braking force) for the vehicle and, based on the calculated braking torque, outputs a hydraulic pressure generation command signal to the caliper 6 as well as a regenerative braking torque command (regenerative braking force command) to the power plant controller 11.

The regenerative brake device 5 includes the motor 3 and the power plant controller 11.

The power plant controller 11 is a device that controls the output torque of the motor 3 while the vehicle is running. In addition, the power plant controller 11 has the function of controlling regenerative braking torque (regenerative braking force) of the motor 3 in accordance with the regenerative braking torque command received from the electric servo brake controller 10.

Also, the power plant controller 11 outputs information on a regeneration torque, which is an actual braking torque generated by the regenerative brake device 5 during braking (during regenerative braking), to the electric servo brake controller 10.

The vehicle is also equipped with a collision avoidance device 20. The collision avoidance device 20 includes an obstacle detection device 21 (obstacle detection device), an ASC controller 22, and the electric servo brake controller 10.

On detecting an obstacle by a radar or the like, the obstacle detection device 21 calculates a required deceleration rate of the vehicle from the distance to the obstacle, the speed of the vehicle and the like, and outputs the calculated deceleration rate to the ASC controller 22, in order to avoid collision with the obstacle.

The ASC controller 22 is a control device used in a vehicle anti-skid device conventionally known in the art and has the function of calculating brake fluid pressures of the individual wheels to be generated during automatic braking in order to prevent skid of the vehicle. In the collision avoidance device 20, the ASC controller 22 is input with a deceleration rate of the whole vehicle from the obstacle detection device 21, then calculates automatic braking fluid pressures of the individual wheels for the automatic braking of the vehicle, and outputs the calculation results to the electric servo brake controller 10.

In accordance with the automatic braking fluid pressure command signal input from the ASC controller 22, the electric servo brake controller 10 outputs a hydraulic pressure generation command signal to the caliper 6 to obtain the required braking torque by the hydraulic brake device 4. In this manner, the collision avoidance device 20 automatically brakes the vehicle so that the vehicle may be prevented from colliding with an obstacle, or if collision is unavoidable, the vehicle may collide with the obstacle at reduced speed.

The electric servo brake controller 10 is also input with obstacle information from the obstacle detection device 21.

The vehicle braking apparatus 1 of the embodiment is characterized by the manner of controlling the regenerative brake device 5 and the hydraulic brake device 4 when the automatic braking is executed by the collision avoidance device 20.

Figure 2:
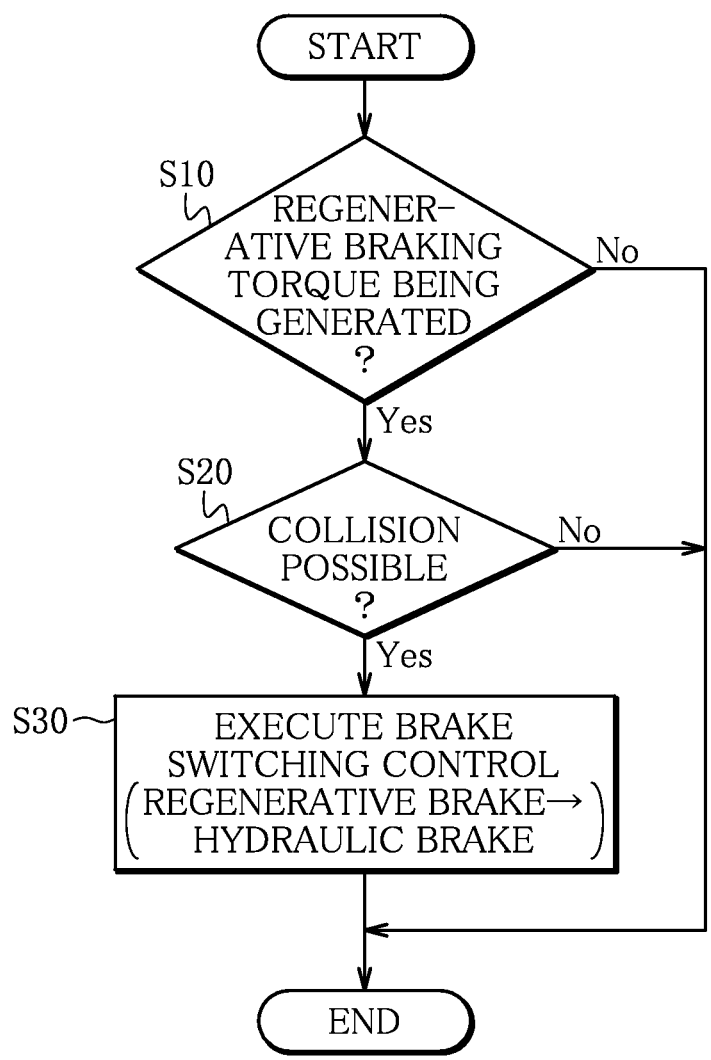
FIG. 2 is a flowchart illustrating a procedure for determining whether to execute brake switching control at the time of automatic braking executed by a collision avoidance device.

FIG. 2 is a flowchart illustrating a procedure for determining whether to execute brake switching control at the time of the automatic braking executed by the collision avoidance device 20.

The illustrated routine is repeatedly executed by the electric servo brake controller 10 while the power supply of the vehicle is on or while the vehicle is running.

First, in Step S10, it is determined whether or not the regenerative braking torque is being generated. Specifically, it is determined whether or not a regenerative braking torque command is being output to the power plant controller 11 (whether or not the regenerative braking torque command is less than zero), and if the regenerative braking torque is being generated, the routine proceeds to Step S20. If no regenerative braking torque is being generated, the routine ends.

In Step S20, it is determined whether or not there is a possibility of collision, namely, whether or not obstacle information has been input from the obstacle detection device 21, and if obstacle information has been input, the routine proceeds to Step S30. If no obstacle information has been input from the obstacle detection device, the routine ends.

In Step S30, brake switching control is executed to perform switching from regenerative braking implemented by the regenerative brake device 5 to hydraulic braking implemented by the hydraulic brake device 4. Then, the routine ends.

Thus, when the regenerative braking torque is being generated and also if there is a possibility of collision, the brake switching control is executed to carry out switching from the regenerative braking to the hydraulic braking.

Figure 3:
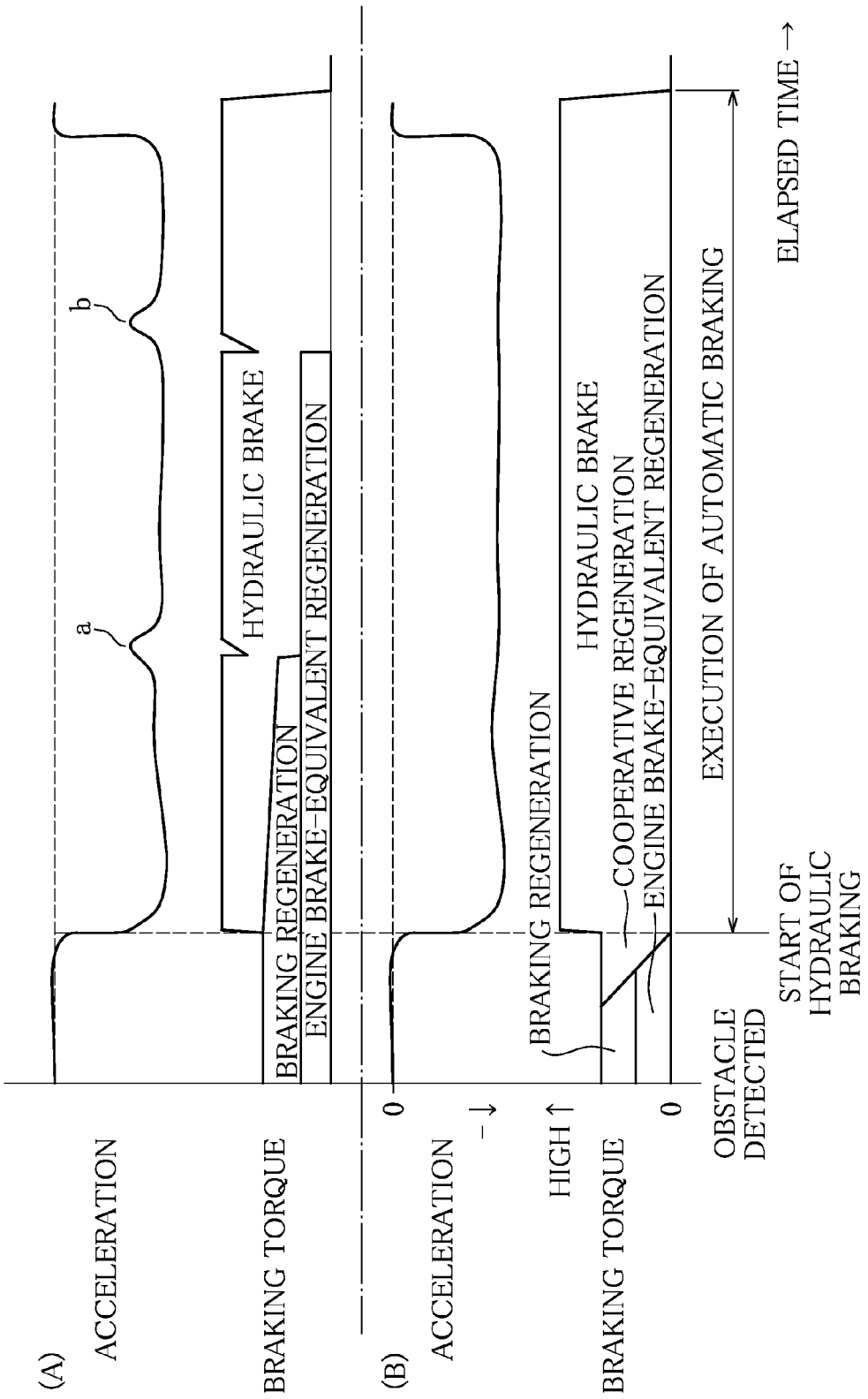
FIG. 3 is a chart showing exemplary transitions of braking torque generated by a hydraulic brake and a regenerative brake and vehicle acceleration at the time of the automatic braking executed by the collision avoidance device.

Referring now to FIG. 3, the brake switching control for switching from the regenerative braking to the hydraulic braking will be explained.

FIG. 3 is a chart showing exemplary transitions of the hydraulic braking torque, the regenerative braking torque and acceleration of the vehicle at the time the automatic braking is executed by the collision avoidance device 20. In the figure, part (A) illustrates transitions according to conventional art in which switching from the regenerative braking to the hydraulic braking is not executed, and part (B) illustrates transitions according to the embodiment in which the brake switching control for switching from the regenerative braking to the hydraulic braking is executed.

The regenerative braking implemented by the electric motor of the vehicle of this embodiment includes engine brake-equivalent regeneration that exerts a regenerative force equivalent to engine braking, and braking regeneration that is added to the engine brake-equivalent regeneration. The engine brake-equivalent regeneration exerts a predetermined low braking torque all the time while the vehicle is running with the accelerator released, and serves to secure electric power for vehicle-mounted devices as well as to restrain increase of the vehicle speed on a downward slope, like the engine brake of an engine-driven vehicle.

The braking regeneration is regeneration that is added to the engine brake-equivalent regeneration and represents a regenerative force exerted by the electric motor, not the braking force exerted by the hydraulic brake, while the driver is depressing the brake pedal.

Torque generated by the engine brake-equivalent regeneration plus the braking regeneration is referred to herein as regeneration torque.

Also, cooperative control between the regenerative brake and the hydraulic brake is referred to herein as cooperative regeneration whereby the regenerative brake, which is low in responsiveness, is compensated for by the hydraulic brake to secure the required braking torque.

The hydraulic braking torque and the regenerative braking torque to be generated during execution of the cooperative regeneration are set by the electric servo brake controller 10.

FIG. 3 illustrates a situation where, while the regeneration torque is generated by the engine brake-equivalent regeneration and the braking regeneration with the brake pedal slightly depressed, an obstacle is detected and hard braking is applied by the collision avoidance device 20.

According to the conventional technique illustrated in part (A) of FIG. 3, the regeneration torque is continuously generated by the engine brake-equivalent regeneration and the braking regeneration even after the automatic braking is initiated by the collision avoidance device 20. That is, the engine brake-equivalent regeneration and the braking regeneration remain active even after the automatic braking is started by the collision avoidance device 20. Thus, according to the conventional technique, generation of the regeneration torque is continued even after the automatic braking is executed and the hydraulic brake device 4 starts to apply braking force in order to avoid collision. The regeneration torque generated by the engine brake-equivalent regeneration and the braking regeneration becomes zero as the state of charge of the battery approaches a full charge. In FIG. 3(A), the torque generated by the braking regeneration becomes zero earlier than the torque generated by the engine brake-equivalent regeneration does.

In the example illustrated in FIG. 3(A), if the battery is fully charged during execution of the automatic braking by way of example, the torque generated by the braking regeneration and the torque generated by the engine brake-equivalent regeneration become zero. When the regenerative braking torque drops, the hydraulic brake is controlled so as to compensate for the drop, but because of control delay, the braking torque of the vehicle as a whole drops instantaneously, causing an instantaneous increase in the acceleration of the vehicle (indicated by "a" and "b" in FIG. 3).

On the other hand, according to the embodiment, the torque generated by the engine brake-equivalent regeneration and the torque generated by the braking regeneration are reduced to zero before the hydraulic braking is initiated to avoid collision, as shown in FIG. 3(B), so that the hydraulic brake may provide all braking torque by the time the automatic braking is started. Reduction of the torque generated by the engine brake-equivalent regeneration and of the torque generated by the braking regeneration may be initiated after the obstacle information is input from the obstacle detection device and before the hydraulic braking is started for collision avoidance.

As described above, according to the embodiment, the brake switching control is performed such that prior to execution of the automatic braking by the collision avoidance device 20 for avoiding collision, the engine brake-equivalent regeneration and the braking regeneration are terminated and the required braking torque corresponding to the regeneration torque is generated by the hydraulic brake, so that the braking force is generated by the hydraulic brake device 4 alone during execution of the automatic braking for collision avoidance. As a consequence, the braking torque does not instantaneously drop during execution of the automatic braking, and since the deceleration rate of the vehicle does not fluctuate, it is possible to prevent the driver and the like from experiencing a feeling of strangeness and to reduce variations in the braking distance.

Also, when the braking torque is switched from the regeneration torque generated by the engine brake-equivalent regeneration and the braking regeneration to the braking torque generated by the hydraulic brake device 4 as shown in FIG. 3(B), the braking torque exerted by the engine brake-equivalent regeneration and the braking regeneration is gradually decreased while the braking torque exerted by the hydraulic brake device 4 is gradually increased to make up for the decrease. This makes it possible to restrain fluctuation of the braking torque also before the automatic braking is initiated for collision avoidance.

The timing for starting reduction of the torque generated by the engine brake-equivalent regeneration and of the torque generated by the braking regeneration may be varied depending on the magnitude of the regeneration torque then exerted. Specifically, when the regeneration torque is high because of depression of the brake pedal, for example, reduction of the regeneration torque may be started early, and when the regeneration torque is low, the timing for starting reduction of the regeneration torque may be delayed. Thus, regardless of whether the regeneration torque is high or low, the regenerative braking force can be reduced to zero before the hydraulic braking is started for collision avoidance, whereby fluctuation of the braking torque can be reliably prevented during execution of the automatic braking, thereby restraining fluctuation of the deceleration rate of the vehicle.

In this embodiment, the brake switching control is executed such that the time at which the braking force exerted by the engine brake-equivalent regeneration becomes zero coincides with the time at which the hydraulic braking for collision avoidance is started. Further, after reduction of the braking torque exerted by the braking regeneration is started, reduction of the braking torque exerted by the engine brake-equivalent regeneration is started. It is therefore possible to prolong the duration time of the engine brake-equivalent regeneration as much as possible before the start of the automatic braking for collision avoidance, contributing to securing the amount of electric power regeneration.

The present invention is not limited to the foregoing embodiment. For example, only the braking torque exerted by the engine brake-equivalent regeneration or only the braking torque exerted by the braking regeneration may be reduced to zero and switched to the hydraulic braking torque prior to the start of the hydraulic braking for collision avoidance.

Various timings such as the timing for starting the hydraulic braking for collision avoidance may be determined on the basis of the distance to the obstacle or the vehicle-to-obstacle time interval calculated from the distance to the obstacle and the speed of the vehicle, and may be determined using the relative speed or relative deceleration between the vehicle and the obstacle in place of the vehicle speed.

Also, the configurations of the hydraulic brake device 4, the regenerative brake device 5 and the collision avoidance device 20 are not limited to those explained above with reference to the embodiment. The hydraulic brake device 4, for example, may be a hydraulic brake device using other fluid than operating oil, or other friction brake device may be used for the purpose. The collision avoidance device 20 may be of any desired type insofar as it is capable of implementing automatic braking upon detection of an obstacle such as a vehicle.

The present invention can be applied to a wide variety of vehicles equipped with a collision avoidance device, a friction brake device and a regenerative brake device.

What is claimed is:

1. A braking apparatus of a vehicle, comprising:
   a friction brake device that brakes the vehicle via friction in response to operation of a brake pedal;
   a regenerative brake device that performs regenerative braking using, as an electricity generator, an electric motor for running the vehicle; and
   a collision avoidance device that performs automatic braking of the vehicle by controlling operation of the friction brake device in accordance with obstacle detection information detected by an obstacle detection device, to avoid collision of the vehicle with an obstacle,
   wherein, when regenerative braking has been activated before automatic braking is commenced, the collision avoidance device is configured to terminate the activation of the regenerative braking before the automatic braking is started by causing the regenerative braking force generated by the regenerative braking device to be gradually reduced and friction braking to be gradually intensified correspondingly to the gradual reduction of the regenerative braking force.

2. The braking apparatus according to claim 1, wherein:
   when the regenerative braking is to be terminated before the automatic braking is started, timing for starting reduction of braking force generated by the regenerative brake device is varied depending on magnitude of the regenerative braking force.

3. The braking apparatus according to claim 2, wherein:
   the regenerative brake device generates a regenerative force that is a sum of a predetermined regenerative braking force exerted by engine brake-equivalent regeneration and acting on the vehicle while the vehicle is running, and a regenerative braking force exerted by braking regeneration and corresponding to an amount of depression of the brake pedal.

4. The braking apparatus according to claim 3, wherein:
   when the regenerative braking is to be terminated before the automatic braking is started, reduction of the braking force exerted by the engine brake-equivalent regeneration is started after reduction of the braking force exerted by the braking regeneration is started.

5. The braking apparatus according to claim 1, wherein:
   the regenerative brake device generates a regenerative force that is a sum of a predetermined regenerative braking force exerted by engine brake-equivalent regeneration and acting on the vehicle while the vehicle is running, and a regenerative braking force exerted by braking regeneration and corresponding to an amount of depression of the brake pedal.

6. The braking apparatus according to claim 5, wherein:
   when the regenerative braking is to be terminated before the automatic braking is started, reduction of the braking force exerted by the engine brake-equivalent regeneration is started after reduction of the braking force exerted by the braking regeneration is started.

* * * * *